Figure 1:
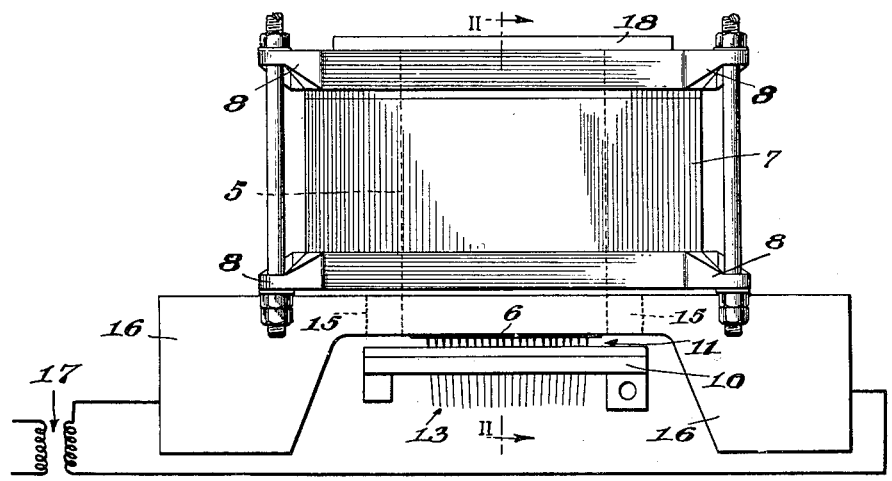
Figure 1:
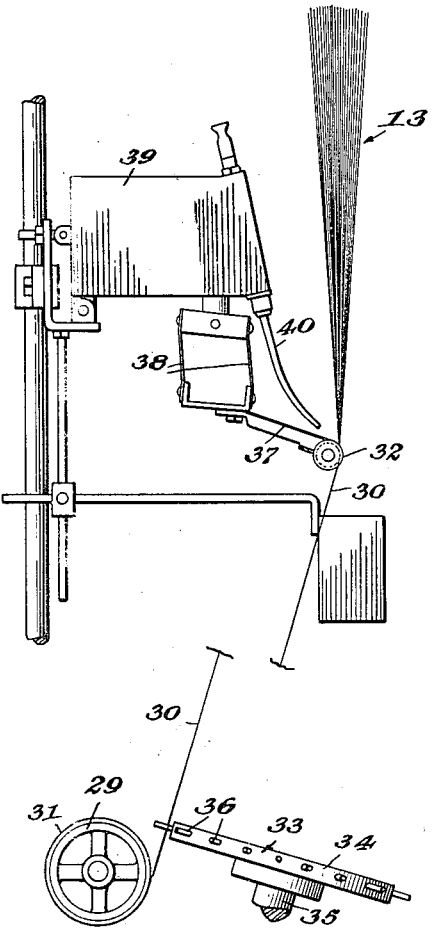

Nov. 3, 1942.   G. SLAYTER ET AL   2,300,736
METHOD OF MAKING FILAMENTOUS GLASS
Filed May 20, 1938   2 Sheets-Sheet 1

INVENTORS
Games Slayter and
J. H. Thomas,
BY Rule & Hoge,
ATTORNEYS.

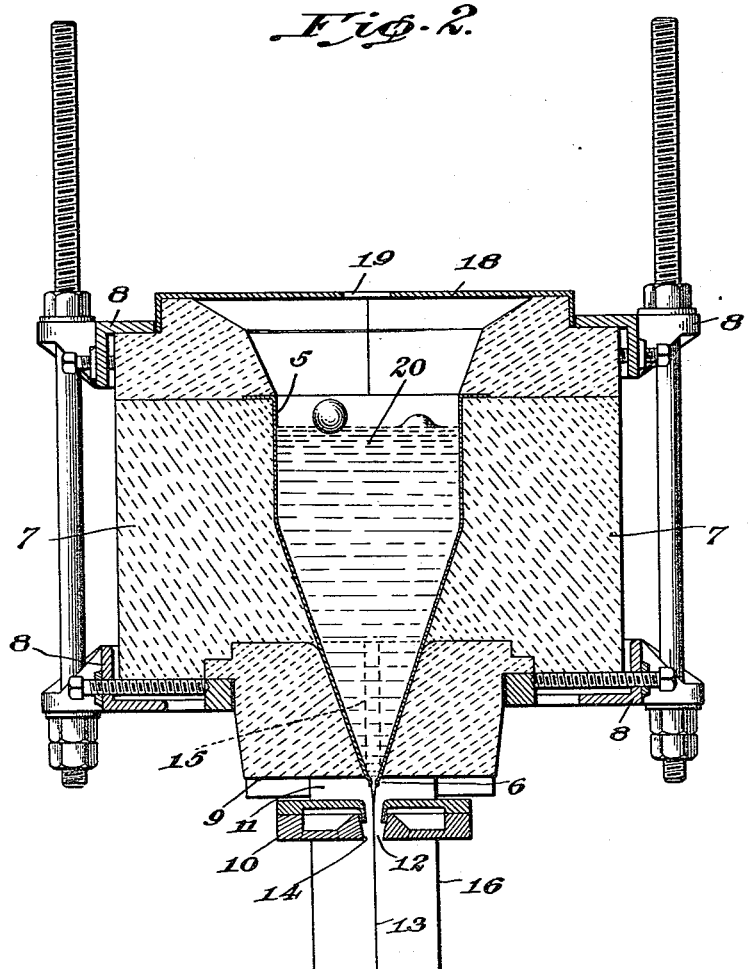

Patented Nov. 3, 1942

2,300,736

UNITED STATES PATENT OFFICE 2,300,736

METHOD OF MAKING FILAMENTOUS GLASS

Games Slayter and John H. Thomas, Newark, Ohio, assignors, by mesne assignments, to Owens-Corning Fiberglas Corporation, a corporation of Delaware Application May 20, 1938, Serial No. 209,038

4 Claims. (Cl. 49—77)

The present invention relates to improved methods of making siliceous filaments.

More particularly, it relates to a novel method of forming fibrous filaments, strands or the like by mechanically drawing the same from a molten pool or body of glass to form our novel filaments.

This application is a continuation in part of our copending application Serial No. 105,405, filed October 13, 1936, now Patent No. 2,234,986.

Heretofore in the mechanical drawing process for attenuating long, fine continuous glass filaments from a molten supply body of glass, very little attention was paid to the viscosity of the molten glass from which the filaments were drawn. As a matter of fact, filaments were drawn from relatively high viscosities, generally in the neighborhood of about 5,000 to 10,000 poises or even higher. In such viscosity range, it would be possible for a bead or drop of glass to issue from a clay orifice of about an eighth to three sixteenths of an inch diameter which is in the range conventionally used. The bead could drop down at this viscosity and carry a tail along with it to impinge upon and adhere to a mechanical drawing drum such as shown in the Von Pazsiczky Patent No. 1,427,014. In actual practice, however, reliance generally is not had upon the automatic renewal of the flow by the falling drop method, but a higher viscosity is generally used and the glass streams are refed to the drum by means of a bait handled by an operator.

Not only were relatively high viscosities lying in the conventional working range of the glass actually used, but it also appeared the most expedient thing to do. If viscosities were decreased, the resistance of the glass to the attenuation pull at the orifice disappeared and there was a tendency for the stream to pull to nothing. Moreover, if lower viscosities were used, the glass rapidly attacked the orifice openings and caused them to change in size whereby all control over the process was lost. Such a result would have very serious effects from a commercial point of view.

The viscosities used by the prior art in producing fibrous glass fall directly within the conventional working viscosity range of glass. As a matter of fact, so far as applicants are aware, there have never been any glass forming operations of any nature except within the conventional working viscosity ranges of the glass. The lower limit of the viscosity range has been established by glass technologists to lie at about 1,000 poises. Below this viscosity the glass is too fluid to form or work properly. Attention in this regard is called to the minutes of the joint meeting of the Society of Glass Technology and the Deutsche Glastechnische Gesellschaft, held in 1930 in London, and published in the "Journal of the Society of Glass Technology" volume 14 (1930), page 159. At this meeting, the glass technologists agreed that there were three temperatures of importance for the characterization of glass. The first is of interest here, since it delineates the lower limit of the working range at about 1,000 poises. It is this conventional working range which the prior art utilized in attenuating their glass filaments.

The filaments produced were coarse, non-flexible and relatively weak. While they were used to some extent in the form of heat insulating mats, it was practically impossible to fabricate them into textiles. At best, bundles of filaments could be tied together with silk threads in a simulated fabric but this could not be folded nor could it be processed on conventional textile machines.

We have discovered that vastly superior results may be achieved by attenuating the filaments from a body of glass in a highly fluid state at a viscosity below the conventional working range, that is, below the critical viscosity of 1,000 poises and preferably in the neighborhood of about 100 to 300 poises. The filaments produced thereby are much stronger, that is, reaching 350,000 pounds or more per square inch. The ultimate strength of these fibers is probably limited by the mutual attraction of the molecules. Some fine glass fibers which may be produced by the present method have been measured and found to possess a strength of a million and even two million pounds per square inch tensile strength.

Moreover, the diameter size of the filaments producible from attenuating the glass from a highly fluid state is extremely fine, being, if desired, below the critical value for textiles of about .0003 to .0004 inch, and if desired, down to .0001 inch. Ordinarily, for most economical production of a commerically satisfactory textile for electric insulation or the like, diameters of about .0002 to .00025 inch are produced.

The flexibility of our glass filaments is another extremely important feature. Heretofore, it has been practically impossible to process glass filaments through conventional textile power machinery. Our method, however, using highly fluid glass produces continuous filaments which may be put through twisting machinery, warpers, winding machinery, high speed looms, or the like, to be woven into a flexible, pliable, foldable, strong piece of cloth. If desired, it is even possible to process our finer filaments through carding machines, although in general, this procedure is not necessary when processing continuous filaments.

Not only are our filaments extremely flexible, but they have also been found to be elastic to a degree unheard of in prior fibers made of like material. As a matter of fact, our glass filaments have been found to be extensible as high as several per cent without fracture, and in some instances have been measured at about as high as 6% or 7%. This property lends toughness to textiles and facilitates equalization of loads among the filaments.

In the prior methods above referred to, when relatively large orifices and high viscosities were used, the ratio between the original diameter and the final diameter of the glass stream was so high that it was difficult, if not impossible, to produce fine glass fibers, that is, fibers having diameters less than about a thousandth of an inch. If attempts were made to produce fine fibers, the stream would tend to break at the point of pull. Thus, as the original outlet from the supply body had a large cross-sectional area, the limited degree of reduction would not permit the glass to be drawn to very fine fibers. Attenuation took place simultaneously over a large portion of the length of the strand and took place throughout a low temperature range. As a matter of fact, it was even possible for the glass fiber to be still hot when it reached the attenuating drum so that it had to be chilled to prevent adjacent strands from sticking to one another. Such an expedient in the form of a water spray to chill the glass just prior to its winding on the drum is suggested in Blum Patent 1,950,219.

In the prior methods when drawing or stretching the fibers gradually at temperatures in the softening range and over a great length, the fibers were internally stressed and weakened. The weakness and coarseness of the prior fibers, we believe, was due in a considerable measure to wrong temperatures and poor temperature control. As the glass was stretched through the softening range, the outer surface chilled first, while the inner core would remain more fluid or plastic. Then as the outer surface tended to solidify and become viscous, it tended to be cracked and become filled with fissures as the stretching continued. The fissures, cracks and discontinuities thus formed by such attenuation, materially weakened the fibers.

We have also discovered that by attenuating the filaments from a highly fluid condition, that is, from a viscosity below the conventional working range of the glass between about 70 and 700 poises, and preferably in the neighborhood of about 100 to 300 poises, it is possible to utilize vastly greater speeds of attenuation. Instead of attenuating the filaments at speeds of about several hundred feet per minute to one or two thousand feet per minute maximum, we are enabled to attenuate the glass filaments at speeds as high as twenty thousand feet per minute and even higher. In practice, however, speeds of around nine thousand feet per minute are generally used in order to facilitate coating of the individual filaments as they pass into strand form. In any event, the speeds which are used are no longer limited by the filamentizing process per se but, rather by other considerations such as coating and packaging. The use of high speeds is extremely important from a manufacturing point of view, since, unless these are used, the production becomes a slow and expensive one.

Thus, in our method of drawing glass to fine, continuous filaments, we have successfully overcome the limitations and shortcomings of the prior art and have produced a new type of fine continuous glass filaments having extremely high tensile strength, flexibility, elasticity and extensibility, and being substantially free from fissures, cracks or discontinuities, and having other new and beneficial characteristics.

It is also an aim of the present invention to provide a method whereby a great multiplicity of fine filaments may be produced within a comparatively small space, thus facilitating adequate and accurate temperature control in their production.

We have found that in the production of fibers having fine diameters that it is important to have strict uniformity and glass composition. Striae, cords or orientation of ingredients should be eliminated. By raising the temperature of the supply body, and rendering the same extremely fluid, the intermixture and more complete solution of the ingredients are facilitated. At lower temperatures, below the melting range, the ingredients are hampered from thoroughly intermixing and at lower temperatures devitrification of the glass may be encountered. Thus, the maintenance of a high temperature and adequate temperature control are a necessity not only in drawing the filaments, but also in the production of the supply body.

It is also within the contemplation of the present invention to provide adequate temperature control for the glass as it passes through or leaves the outlet orifice in order that the attenuation may be accelerated and accomplished within in a relatively short distance, preferably a fraction of an inch. By such control, highly fluid glass may be made to immediately neck down to its ultimate fiber size without any long drawn out attenuation over a considerable length intermediate the outlet orifice and the winding drum, as was commonly done by the prior art. When attenuation takes place simultaneously over long lengths, it is considerably more difficult to regulate the final fiber diameter, and it is almost impossible to produce a uniform attenuation throughout the length of the filament. Thick and thin spots and other irregularities also are commonly present as well as a multiplicity of minute strains, checks and other discontinuities, particularly at the surface.

Other objects and advantages of the present invention will become apparent from the following description taken in conjunction with the drawings in which:

Fig. 1 is an elevational view of an apparatus adapted to produce glass filaments and strands thereof in accordance with the present invention, the individual parts thereof being shown grouped together in closer proximity than in preferred practice; and Fig. 2 is a cross-sectional elevational view of the melting unit taken along the line II—II of Fig. 1.

Referring now more particularly to the drawings, reference character 5 designates a melting crucible, preferably of metal such as platinum or the like, although other metals of nichrome, iron or the like may also be used. If desired, an ordinary refractory crucible, forehearth, tank or the like may also be used, although ordinarily the temperatures available to the latter type of apparatus are not sufficiently high to permit adequate viscosities to be used in accordance with the present invention. For this reason, the platinum or its alloys is preferred.

The crucible 5 is provided at the lower end thereof with a series of outlet orifices 6 adapted to emit glass in fine streams capable of being attenuated rapidly into filaform. The crucible 5 is held within a suitable refractory container 7 which may be supported by a framework 8. The lower end of the crucible 5 is preferably converging downwardly to the outlet orifices 6 in order to provide more uniform streamline flow to the glass and prevent, so far as possible, turbulence or other disturbance to the flow. The individual outlets 6 are preferably in the form of a series of nipples which extend downwardly below the bottom of the crucible walls, these nipples being spaced apart from one another slight distances in order to prevent molten glass from bridging across from one nipple outlet to the other and thus fouling the entire operation when one nipple flow has been interrupted. The orifices may be placed in rows with the individual nipples staggered in order to more uniformly expose the nipples to induced air, hereinafter more completely described.

Spaced apart from the lower edge 9 of the refractory container 7 may be a blower 10, sufficient space preferably intervening between the blower 10 and the bottom 9 to provide channels 11 for the introduction of induced air. The blower 10 is formed in two halves facing each other having a slot 12 therebetween into which the streams of glass enter from the nipples 6 to form a series of filaments 13. Each half of the blower 10 is provided with a row of jets 14 facing the slot 12 adapted to emit a mild blast or draft of gas downwardly along the length of the individual filaments 13. The draft of gas emerging from the jets 14 causes induced air to be drawn over the tops of the blowers through the channels 11 impinging upon the nipples 6 and the glass exposed thereat. The induced air then flows downwardly into the slot 12 and merges into the draft from the jets 14.

The crucible 5 may be electrically heated by passing electrical energy therethrough. For this purpose lugs 15 may be fixed integrally to each end of the crucible 5 to which may be fastened electric terminals 16, communicating with suitable electrical energy supply means 17. If desired, a cover plate 18 may be fitted over the top of the crucible in order to confine the heat therein. This plate may have an opening 19 therethrough into which may be fed the glass batch, cullet or the like, to form the supply body of molten glass 20. The use of glass cullet in spherical form, and preferably internally strained, has proved very satisfactory in the operation of the present invention.

As the streams of glass emerge from the individual nipples 6, they rapidly neck down to their ultimate filament size and are solidified in this form, preferably within a small distance such as a fraction of an inch from the nipples 6. Attenuation is effected by means of a revolving spool or drum 29 on which the individual filaments 13 are wound in the form of a strand 30 to form a package 31.

The filaments 13 as they emerge from the nipples 6 are preferably grouped together and drawn over a guide 32 in the form of a groove or eye which serves to size or coat the individual filaments and simultaneously group them into the strand 30. In being drawn over the guide 32, the filaments are preferably turned through as small an angle as possible in order to reduce to a minimum the amount of force exerted by the strand upon the guide and the resultant friction. The strand 30 may be traversed by means of a traverse 33 which in the instant case is in the form of a disk 34 revolving upon an axis 35 and provided with a multiplicity of pins 36 extending radially outwardly from the periphery of the disk 34.

In operation of the traversing device 33, the individual pins 36 successively engage the strand 30 and traverse the same across the length of the package, whereupon the pins are withdrawn either by mechanical means or by merely passing out of the tangential path of the strand 30. The strand then automatically of its own accord traverses itself back to the other end of the package where it is engaged again by the next succeeding pin 36. The traversing of the strand back to its original position may be accomplished by offsetting the spool or drum 29 in relation to the guide 32.

The gathering and lubrication guide 32 is preferably made of very light metal such as aluminum in order to keep its inertia as low as possible. The free end of the guide around which the fibers are drawn may be provided with a rounded outer surface covered with a suitable porous material such as a felt, muslin, sponge, paper or the like. The uper portion 37 of the guide is in the form of an inclined trough upon which the coating substance may be introduced to the groove over which the filaments are drawn. The guide 32 may be mounted upon suitable flexible supports 38 such as flexible metal tapes of spring steel or the like adapted to yieldingly support the guide 32. The spring tapes 38 are mounted at the bottom of a container 39 filled with a suitable sizing material or substance which is fed down to the trough 37 by means of tube 40. The coating substances may be any desired materials, such as wax, oils, starch, agar agar, sulphonated oils, bitumins, fatty acids, alcohols, glue, ester, gluten, soap, pectin, rubber, latex, varnish, rosin, shellac, synthetic resins, resinates, plastics, cellulose compounds or derivatives, or combinations thereof, whether in molten condition, solution form, or in the form of an emulsion. Ordinarily a light oil or an oil, starch emulsion having a low surface tension is quite satisfactory. Molten waxes may also be used with success, if desired.

In operation of the present device, the cullet or raw glass materials may be fed through the opening 19 of the cover 18 to the interior of the crucible 5, as noted, to establish a supply body of molten glass in a highly fluid state. It has been found best to use glass which has already been fined so that the elimination of gases is not a problem, although if desired the mass may be raised sufficiently in temperature and for a sufficient period of time, as one skilled in the art would understand, to eliminate seeds and gas bubbles. The glass in this state forms a homogeneous solution, and gradually passes downwardly to the orifice openings or nipples 6, where the glass is exposed to the outer atmosphere and passes in the form of fine streams. The orifice openings 6 are preferably very small, being in the order of magnitude of about .020 to .08 of an inch, suitably in commercial operation about .030 to .040 of an inch.

The viscosity of the glass passing through the fine orifices is below the working range of about 1,000 poises, more generally in a range of from about 70 to 700 poises, and preferably between about 100 to 300 poises. At this low viscosity the glass is in a highly fluid state and flows readily through the fine orifices 6. In view of the high speed of attenuation of the individual glass streams, the glass immediately necks down to extremely fine diameters in close proximity to the individual outlet orifices and freezes to fine filamentous form. It is to be observed that by using an extremely fine stream, the heat capacity of the glass is small and after exposure to the outer atmosphere may chill rapidly to solidity. This prevents attenuation over a long length with its attendant difficulties.

The blast of induced cooling air entering through the passage 11 is desirable to more rapidly chill the glass from its highly fluid condition to fluidity, although ordinarily a very low pressure of gas blast is required. Ordinarily about one quarter to two or three pounds of air in the blower 10 is sufficient to maintain uniform temperature conditions of the glass as it is attenuated to solid form.

While very low air pressures in the blower 10 have been found satisfactory during the attenuation of the individual filaments, for practical reasons, it has been found desirable to immediately increase the gas pressure in the blower 10 as soon as the attenuation of the individual filaments is stopped. By raising the gas pressure by suitable means either mechanical or by hand, as soon as attenuation is interrupted, the glass emerging at the individual outlet orifices is slightly chilled and prevented from flowing over the entire bottom and fouling each one of the filament streams as they are suspended from the outlets. In other words, the glass at the low viscosity emerging from the outlet orifices is prevented from fouling the entire bottom of the crucible 5 when attenuation has been interrupted or stopped for any reason. If desired, when restarting the operation, a higher blast pressure may be used to initiate the flow by actual pulling by the gaseous blast. When the filaments are sufficiently long for an operator to hold them all in one hand, they may be pulled down rapidly together by hand, and then drawn over the lubricating guide 32 and wrapped around the spool or drum 29 to carry on the attenuation mechanically at full speed. The gas pressure may then be reduced to very low pressure.

Various modifications and variations may be resorted to within the spirit and scope of the present invention as defined in the appended claims. For example, other suitable means may be provided for attenuating the filaments at a constant rate and forming a package thereof.

We claim:

1. The method of producing a fine glass filament which comprises establishing a body of molten glass in a very fluid state, passing said glass downwardly through a very fine orifice opening at a viscosity in the range of 70 to 700 poises, exposing the glass to the atmosphere at said low viscosity, and mechanically drawing a filament at high speed from said fluid glass.

2. The method of producing a long, fine filament of siliceous material which comprises establishing a body of molten glass, passing said glass downwardly while in a range of viscosity of from 100 to 300 poises through a fine orifice, exposing the glass to the atmosphere at said low viscosity, drawing a filament at high speed from said orifice by mechanical means, and winding said filament continuously in the form of a package.

3. The method of producing a fine glass filament which comprises establishing a molten supply body of glass in a very fluid state, passing said glass through a fine orifice at a viscosity in the range of 70 to 700 poises, exposing the glass to the atmosphere at said low viscosity, mechanically pulling a fine filament continuously and at a constant speed from the glass emerging from said orifice, and accelerating the cooling of said glass at said orifice by means of a fluid medium applied to the glass immediately as it emerges from said orifice.

4. The method of producing a long, fine glass filament which comprises establishing a body of molten glass in a very fluid state, passing said glass through an orifice of not more than .08 of an inch at a viscosity in the range of from 70 to 700 poises, exposing the glass to the atmosphere at said low viscosity, mechanically drawing a filament at high speeds above 5000 feet per minute from said fluid glass in a manner to completely attenuate the same in close proximity to the orifice.

GAMES SLAYTER.
JOHN H. THOMAS.